United States Patent
Barker et al.

[11] Patent Number: 6,164,597
[45] Date of Patent: Dec. 26, 2000

[54] USING REFLECTED SOLAR RADIATION PRESSURE TO PROVIDE STATIONKEEPING MANEUVERING OF A SPACECRAFT

[75] Inventors: Lee A. Barker, San Jose; Benjamin Lange, San Francisco, both of Calif.

[73] Assignee: Space Systems/Loral, Inc., Palo Alto, Calif.

[21] Appl. No.: 09/368,980

[22] Filed: Aug. 5, 1999

[51] Int. Cl.[7] .................................................... B64G 1/24
[52] U.S. Cl. ........................................... 244/168; 244/173
[58] Field of Search ................................. 244/158 R, 160, 244/173, 172

[56] References Cited

U.S. PATENT DOCUMENTS

| | | | |
|---|---|---|---|
| 4,262,867 | 4/1981 | Piening | 244/168 |
| 4,591,116 | 5/1986 | Guenther et al. | 244/168 |
| 4,759,517 | 7/1988 | Clark | 244/168 |
| 5,183,225 | 2/1993 | Forward | 244/168 |
| 5,618,012 | 4/1997 | Lehner et al. | 244/168 |
| 5,697,582 | 12/1997 | Surauer et al. | 244/168 |
| 5,775,645 | 7/1998 | Yocum, Jr. et al. | 244/168 |

*Primary Examiner*—Galen L. Barefoot
*Attorney, Agent, or Firm*—Kenneth W. Float

[57] ABSTRACT

Methods that provide stationkeeping maneuvering of a yaw steered spacecraft that orbits around a central body, such as the Earth, and experiences solar radiation pressure produced by the sun. The methods comprise the following steps. A spacecraft having a solar array is launched into orbit at a desired orbital location. Once the spacecraft is in orbit at the desired orbital location, a reflected component of the solar radiation pressure is caused to selectively apply a force to the spacecraft that moves the spacecraft to perform stationkeeping maneuvers. The reflected component of the solar radiation pressure may be caused to selectively apply a force to the spacecraft in two exemplary ways. In one embodiment, the spacecraft is yaw steered to follow a yaw steering profile so that the axis of the solar array is substantially normal to a plane containing the sun vector and nadir vector. The orbit of the spacecraft is then controlled to provide stationkeeping by applying an additional bias to the yaw steering profile. In another exemplary embodiment, the orbit is controlled to provide stationkeeping by tilting (or rotating) the solar array so that the solar array is at a predetermined angle relative to the sun vector. The additional bias or tilting may be applied as a command from a control station that is remotely located from the spacecraft (on the Earth), or applied as a command in a command and control system on the spacecraft.

11 Claims, 4 Drawing Sheets

6 AM SRP GEOMETRY

6 PM SRP GEOMETRY

6 AM SRP GEOMETRY

6 PM SRP GEOMETRY

USING REFLECTED SOLAR RADIATION PRESSURE TO PROVIDE STATIONKEEPING MANEUVERING OF A SPACECRAFT

BACKGROUND

The present invention relates generally to spacecraft control methods, and more particularly, to methods that provide stationkeeping maneuvering of spacecraft using reflected solar radiation pressure via yaw biasing and mechanical means.

There has been unusual orbital behavior observed in Globalstar spacecraft deployed by the assignee of the present invention, and in particular, spacecraft that are currently configured to operate with a yaw bias while in yaw steering mode. These spacecraft, all located in plane 'A' of the Globalstar constellation, have been observed to gain or lose orbit energy in the form of changes to the absolute semi-major axis. This energy source/sink exceeds the atmospheric drag force by up to an order of magnitude. This energy exchange is observable, repeatable, and has been found to be a directly proportional function of the orbit plane 'beta' angle. Careful analysis has shown the source of the force to be a solar radiation pressure differential due to reflected solar energy resulting from operations with yaw biases. The resulting orbital behavior has implications for both the stationkeeping strategy of the current Globalstar spacecraft as well as design implications for future spacecraft that will operate with yaw steering. With these considerations in mind, future yaw steered spacecraft operating in the low earth orbit (LEO) regime may take advantage of differential solar radiation reflection to augment thrusters for orbit maintenance.

More specifically, in observing the orbital behavior of Globalstar spacecraft operating in yaw steering mode with a 165 degree yaw bias, it has been discovered that solar radiation pressure (SRP) can apply a force parallel or antiparallel to the orbital velocity vector. This force has an average sign around the entire orbit which is the same as the sign of the orbit plane beta angle. When the bias is between 90 and 180 degrees or 0 and −90 degrees, and the orbit plane beta angle is positive, the force is posigrade, and when the orbit plane beta angle is negative, the force is retrograde. When the bias is between 0 and 90 degrees or between −90 and −180 degrees, this is reversed. The sign of the average force is given by −sign(bias) * sign(beta angle). It would be desirable to use this force to advantage to control stationkeeping activity of the spacecraft.

Accordingly, it is an objective of the present invention to provide for methods that provide stationkeeping maneuvering of spacecraft using reflected solar radiation pressure via yaw biasing and mechanical means.

SUMMARY OF THE INVENTION

To accomplish the above and other objectives, the present invention provides for the use of a reflected component of solar radiation pressure to overcome atmospheric drag and perform stationkeeping maneuvers by controlling the orbit of the spacecraft to provide stationkeeping by causing a reflected component of the solar radiation pressure to selectively apply a force to the spacecraft that moves the spacecraft to perform stationkeeping maneuvers. This may be achieved by controlling a small yaw bias to the spacecraft in yaw steering mode. Alternatively, the stationkeeping maneuvers may be implemented by tilting a solar array slightly off perpendicular to the sun by using an array tilt mechanism. Using the present invention, stationkeeping of the spacecraft may be performed without using thrusters. Instead, a positive or negative yaw bias or solar array tilting is used. This makes spacecraft using the present invention less sensitive to thruster failure.

More particularly, the present invention comprises a method that provides stationkeeping maneuvering of a spacecraft that orbits around a central body, such as the Earth, and experiences solar radiation pressure produced by the sun. One exemplary embodiment of the method comprises the following steps.

A spacecraft having a solar array is launched into orbit at a desired orbital location. Once the spacecraft is in orbit at the desired orbital location, the spacecraft is yaw steered to follow a yaw steering profile so that the axis of the solar array is substantially normal to a plane containing the sun vector and nadir vector. The orbit of the spacecraft is then controlled to provide stationkeeping by applying an additional bias to the yaw steering profile. This action rotates the spacecraft around an axis that points toward the central body by a predetermined angular amount to cause a reflected component of the solar radiation pressure to selectively apply a force to the spacecraft that moves the spacecraft to perform stationkeeping maneuvers.

The additional bias may be applied as a command from a control station that is remotely located from the spacecraft (on the Earth). Alternatively, the additional bias may be applied as a command in a command and control system on the spacecraft that automatically applies the additional yaw bias.

An alternative embodiment of the method comprises the following steps. A spacecraft having a solar array is launched into orbit at a desired orbital location. Once the spacecraft is in orbit at the desired orbital location, orbit of the spacecraft is then controlled to provide stationkeeping by tilting (or rotating) the solar array to a desired angle, using an array tilt mechanism, for example, that causes a reflected component of the solar radiation pressure to selectively apply a force to the spacecraft that moves the spacecraft to perform stationkeeping maneuvers.

In using the present invention, the spacecraft is much less sensitive to thruster failure. It is operationally simpler and less risky to stationkeep the spacecraft by yaw biasing, since the only commanding requirement is a yaw bias angle, as needed. The lifetime of fuel critical spacecraft may be considerably extended when using the present invention. Propellant reserves for non-fuel critical spacecraft may be used for end-of-life de-orbit, lowering the spacecraft to an altitude where it would decay in a reasonable time period. Some spacecraft may be designed without propulsion systems, using the present invention to maintain orbit.

The method of the present invention differs from previous art relating to solar array stationkeeping for geostationary spacecraft. Among other things, the present method is not necessary to change the sign of the bias or perpendicularity offset twice per orbit cycle. Rather, the sign is changed only twice per sun angle cycle, i.e., twice per approximately every six weeks. This results in a much simpler stationkeeping method.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Globalstar spacecraft operate in yaw steering mode approximately 80–90 percent of their on orbit life. The remainder of the time is primarily spent in orbit normal when the magnitude of the sun angle with respect to the orbit plane (beta) is less than 12 degrees. During the last year of on-orbit operations, those Globalstar spacecraft operating with a yaw bias in the yaw steering mode have exhibited orbital behavior different from those spacecraft not operating with a bias in yaw steering. Specifically, while operating with a yaw bias of 165 degrees, the spacecraft have been observed to gain or lose orbital energy as a direct proportional function of the beta angle. This energy change manifests itself as a change in absolute semi-major axis and the rate of change can exceed plus or minus one meter per day. It is possible to measure this change using Globalstar's filtered GPS navigation solution for orbit determination.

Figure 1:
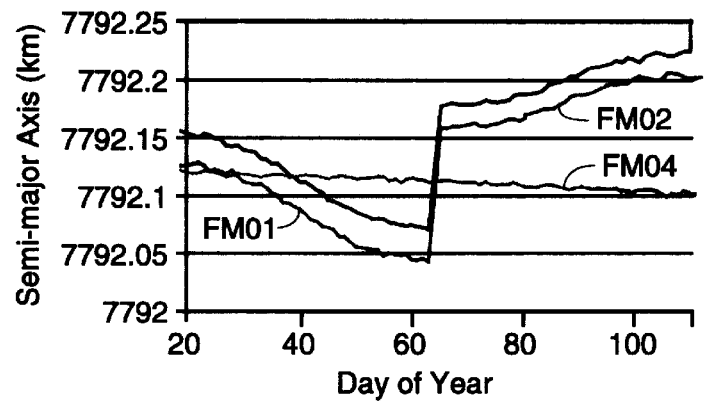
FIG. 1 shows a plot of semi-major axis over time for a spacecraft (FM04) operating in unbiased yaw steering and orbit normal operations and two spacecraft (FM01 and FM02) operating in yaw steering with a 165 degree yaw bias.

Referring to the drawing figures, an example of this behavior is illustrated in FIG. 1. FIG. 1 shows a plot of semi-major axis over time for a spacecraft (FM04) operating in unbiased yaw steering and orbit normal operations and two spacecraft (FM01 and FM02) operating in yaw steering with a 165 degree yaw bias. The time span is two stationkeeping cycles. All three spacecraft are in the same orbital plane. Beta goes from zero to approximately −66 degrees then back through zero to +55 degrees, then back to zero over this time span. The discontinuity in the yaw biased spacecraft represents stationkeeping thruster firings conducted during orbit normal operations when beta is near zero. Spacecraft FM04 shows the expected behavior due to atmospheric drag over the same period.

For a spacecraft operating with a bias, the rates of change in orbit altitude reduction exceed the 0.1–0.5 meters per day expected as the result of atmospheric drag, and the rates of increase in semi-major axis are unexplainable without the use of some external force since no thruster activity was conducted. It has been determined that the external force responsible for this phenomena is the reflective component of the solar radiation pressure. Understanding this phenomena will lead to better stationkeeping of the spacecraft of interest and may allow for "thrusterless" stationkeeping in the future.

The observed data shows the rate of semi-major axis change to be directly proportional to the sine of the current beta angle for the spacecraft. For the case where beta is positive and orbit energy is increasing, a typical stationkeeping cycle of approximately 50 days exhibited about 50 meters increase in altitude, or an average gain of about 1 meter per day. The peak rate of change occurred when beta was near its maximum value. During this period, semi-major axis was observed to increase 28 meters in 14 days, or about 2.0 meters per day.

To calculate the force required to change the semi-major axis of a spacecraft in near circular orbit using a low thrust source, a reference entitled "An Introduction to the Mathematics and Methods of Astrodynamics", by Richard H. Battin, American Institute of Aeronautics and Astronautics, New York, 1987, derives the new orbit radius, r, as a time dependent function of the original orbit radius, $r_0$, and the tangential acceleration:

$$r = r_0 / (1 - (2 \cdot dt \cdot a_T / V_0))$$

Solving for the tangential acceleration, $a_T$, for the Globalstar orbit, one gets a required acceleration of approximately 1.06e-11 Km/S$^2$ in order to produce a 2.0 meter per day change in radius. Assuming nominal on orbit mass values for the spacecraft (mass=−430 kg), the required force can be determined using F=ma. The resulting required force for a Globalstar spacecraft is approximately 4.6 $\mu$N applied in the tangential direction averaged throughout the orbit.

Figure 2:
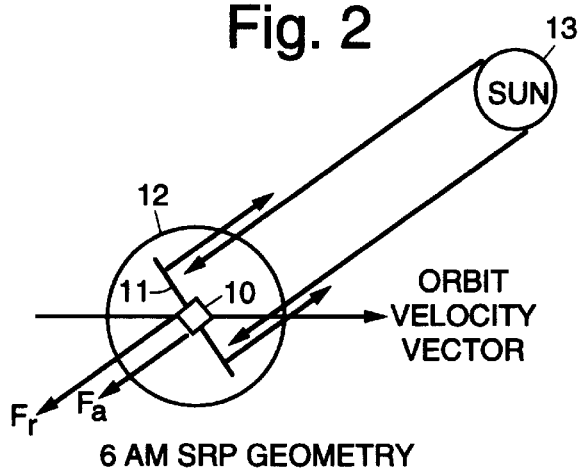
FIGS. 2 and 3 illustrate the geometry of the solar radiation pressure force on a non-biased yaw steered spacecraft at the 6 AM and 6 PM spacecraft local time points in the orbit.
Figure 3:
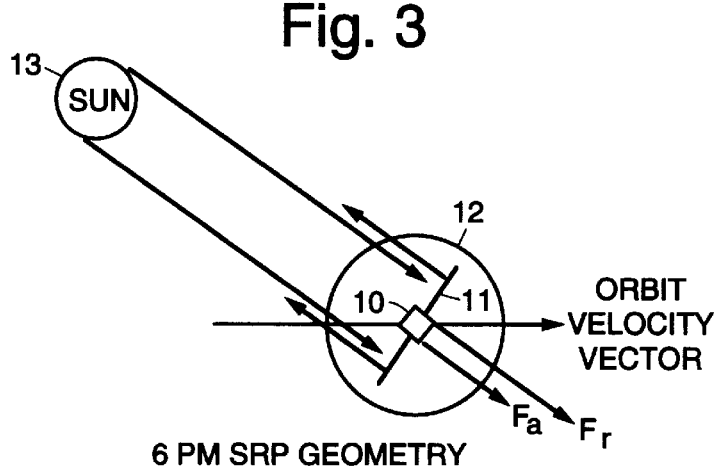

Referring to FIGS. 2 and 3, a spacecraft 10 in yaw steering mode, by definition, holds its Y axis (the axis of its solar array 11) normal to the plane containing the sun vector and the nadir vector. The Z axis of the spacecraft 10 is into the plane of the drawing figure and is pointed toward a central body 12 (Earth 12). For such a spacecraft 10, the tangential force due to solar radiation pressure caused by energy from the sun 13, both absorptive and reflective, is sinusoidal over the orbit and sums to zero. While there may be some small effects on eccentricity, like those experienced by geosynchronous spacecraft, the overall energy gain to the system should be zero. FIGS. 2 and 3 illustrate the geometry of the solar radiation pressure force on the spacecraft 10 at the 6 AM and 6 PM spacecraft local time points in its orbit.

Figure 4:
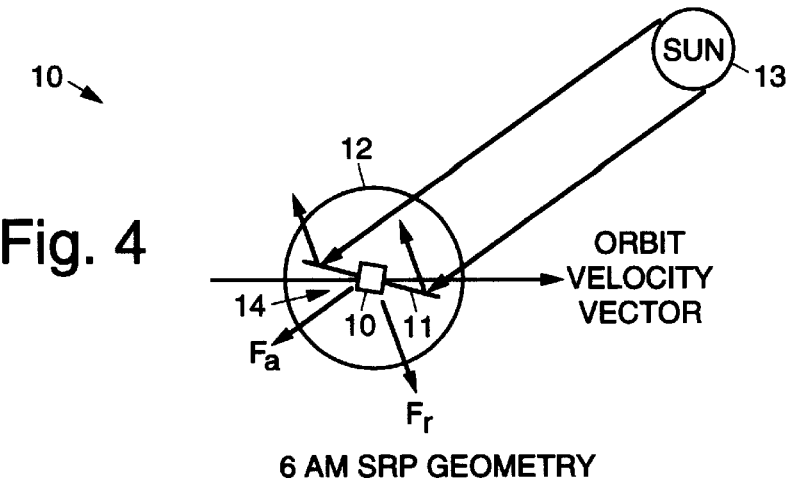
FIGS. 4 and 5 illustrate the geometry of the solar radiation pressure force on the spacecraft with a 165 degree yaw bias at the 6 AM and 6 PM spacecraft local time points in the orbit.
Figure 5:
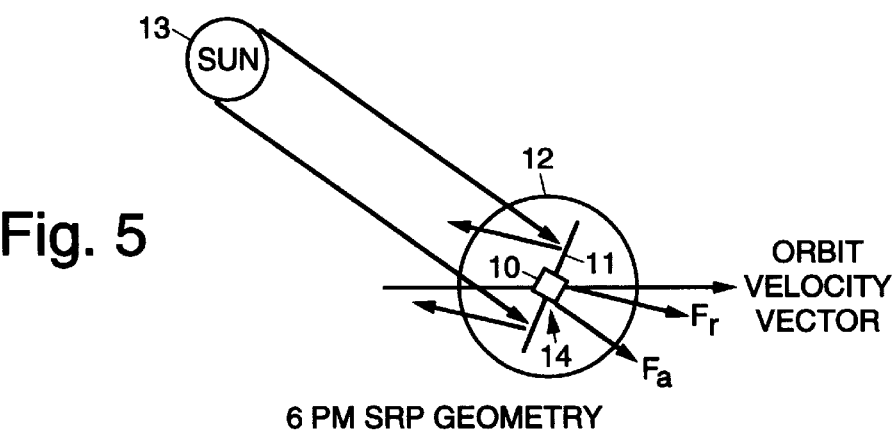

While the absorptive component of solar radiation pressure continues to sum to zero over the orbit for a spacecraft 10 in yaw steering mode with yaw bias, the reflective component does not. FIGS. 4 and 5 illustrate the geometry of the solar radiation pressure force on the spacecraft 10 with a 165 degree yaw bias at the 6 AM and 6 PM spacecraft local time points in the orbit. At both 6 AM and 6 PM, the reflected sun light has force components in the direction of orbital motion. This results in an increase in orbit velocity and thus energy and semi-major axis.

Some texts assume that the reflected component of solar radiation pressure is two times the momentum change of the reflected light in the direction normal to the reflecting surface (the solar array 11). This is the resulting force from the inbound component of the photon momentum, which lies in the same path as the absorbed component of solar radiation pressure force, and the reflected component of force, which is opposite the direction of the reflected light.

For the purposes of the present invention, the inbound portion of the momentum can be treated in the same way the absorbed photons are treated, averaging to zero over the orbit. This leaves a reflected component not perpendicular to the reflecting surface, but at an equal and opposite angle to the normal from the absorbed force. Since the incoming momentum change averages to zero around the orbit, the only component left is the reflected momentum change. This reflected component does not average to zero around the orbit. Thus, this component is not multiplied by two.

Figure 6:
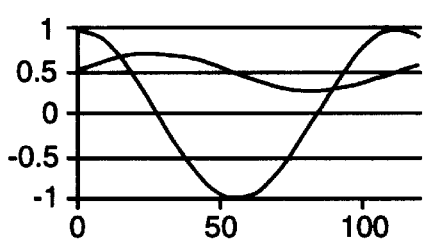
FIGS. 6 and 7 illustrate simulation results for high positive and negative beta angles to observe intrack components of the absorptive and reflective components of solar radiation pressure force on a yaw biased spacecraft.
Figure 7:
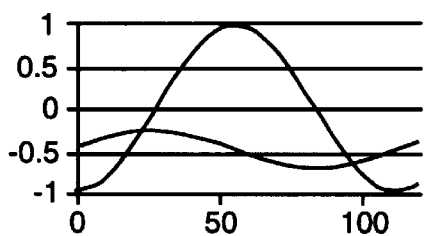

It is difficult to visualize the geometry at other points around the orbit. For this, a simulation was run to observe the intrack components of the absorptive and reflective components of solar radiation pressure force on the yaw biased spacecraft 10. FIGS. 6 and 7 illustrate these for high positive and negative beta angles. As the beta angle progresses from positive through zero and increases in the negative direction, the average intrack reflected solar radiation pressure force component moves from positive to negative. The average absorptive component remains zero.

Figure 8:
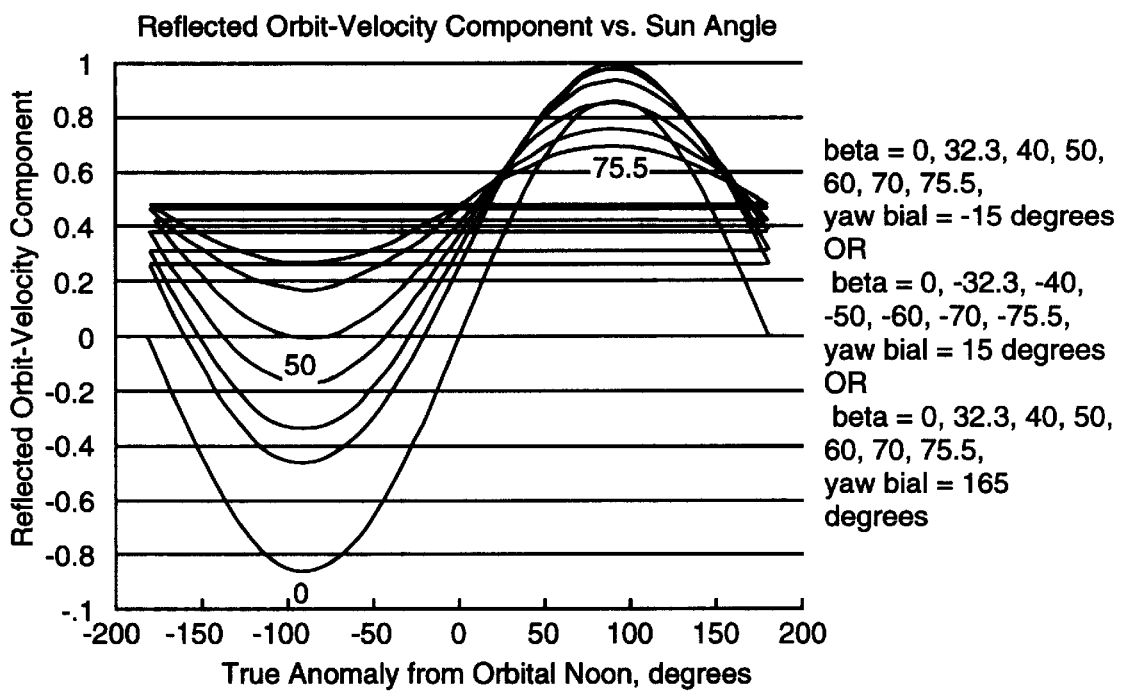
FIGS. 8 and 9 show plots of the unit vector component of the reflected solar radiation pressure force in the intrack direction versus orbit position by beta angle.
Figure 9:
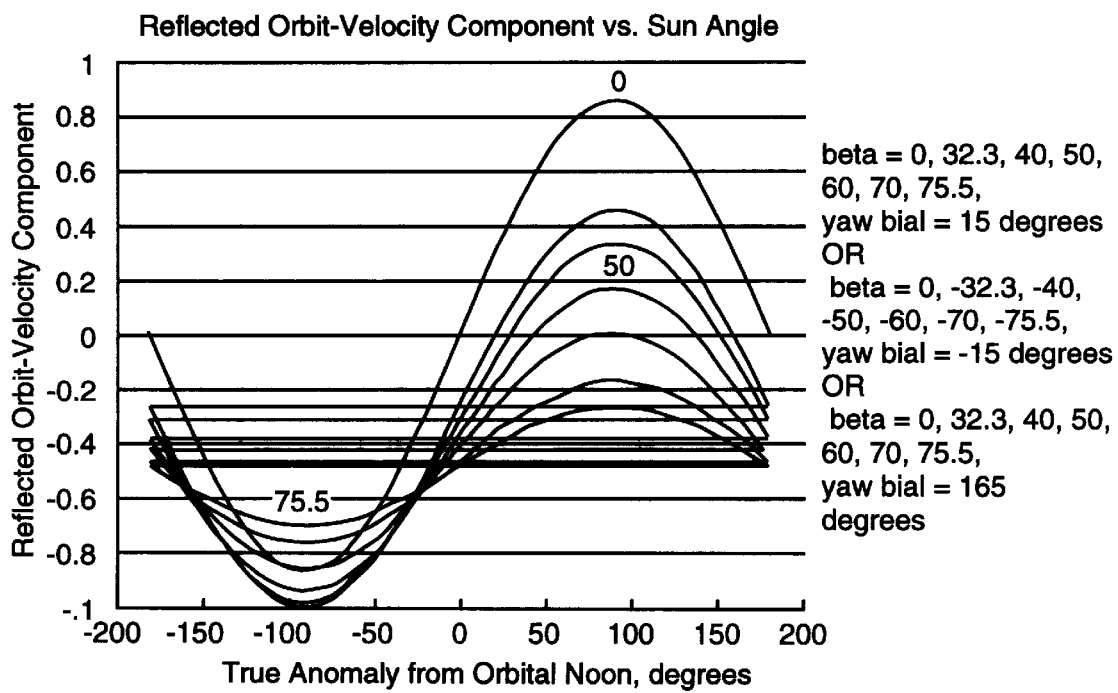

The unit vector component of the reflected solar radiation pressure force in the intrack direction versus orbit position by beta angle is plotted in FIGS. 8 and 9. The average over the orbit for each beta angle is also shown in these plots. These plots apply for yaw biases of 15, −15, and −165 degrees as well.

Figure 10:
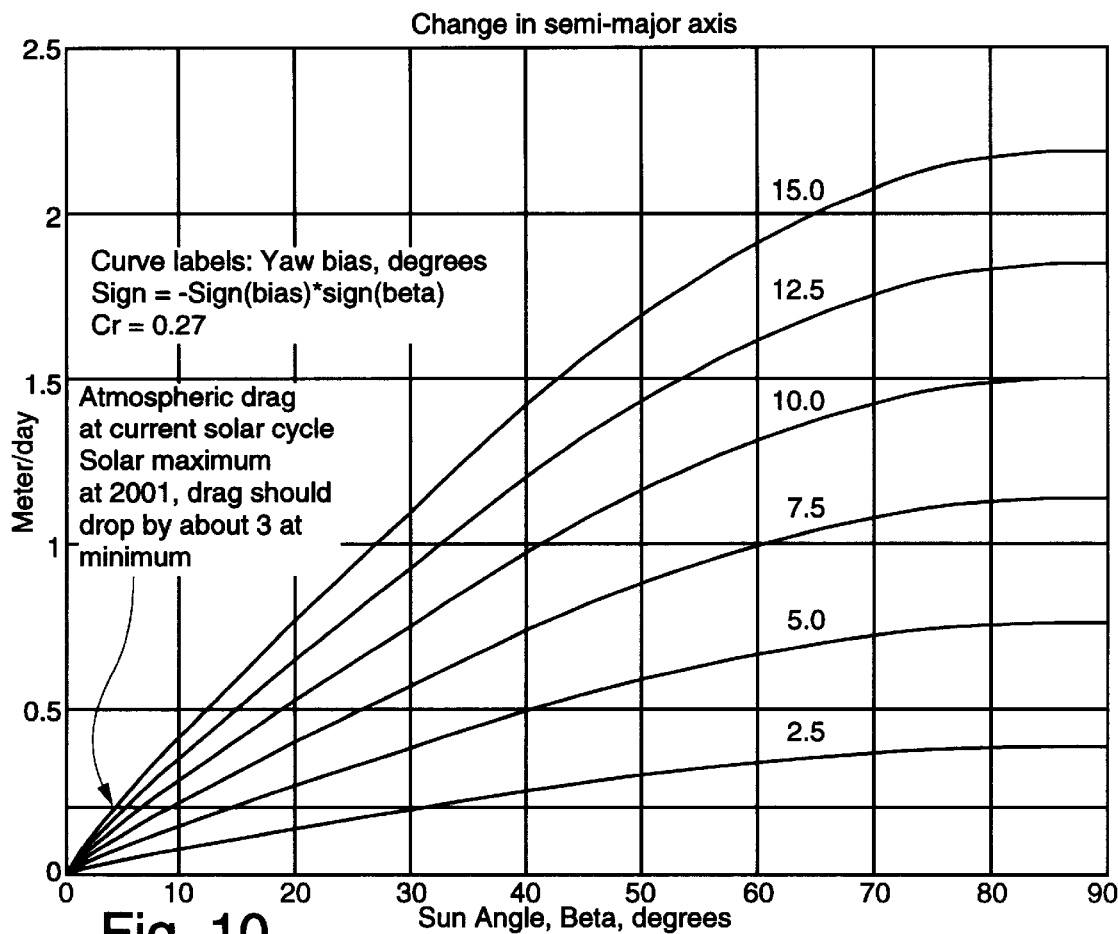
FIG. 10 shows the change in semi-major axis caused by yaw bias with reflection coefficient of 0.27, and the average reduction due to drag at an altitude of 1400 kilometers.

FIG. 10 shows the change in semi-major axis caused by yaw bias with reflection coefficient of 0.27 and also shows the average reduction due to drag at an altitude of 1400 kilometers. The curves are expressions of the equation $$\dot{a} = -\sin(2(\text{yaw bias})) * \sin(\text{sun beta angle}) * k,$$

where $\dot{a}$ is the change in semi-major axis and k is a constant which depends on the orbit.

Having identified a potential source for the external force acting on the spacecraft 10, it will now be shown that the force provided by the reflected solar radiation pressure is sufficient to result in the 2.0 meter per day observed change in semi-major axis. The following equation defines the intrack force due to the reflected component of solar radiation:

Force=SRP reflected force vector component in velocity direction·$C_{reflectivity}$, where $C_{reflectivity}$, the coefficient of reflectivity for the solar array 11, is approximately 0.26 for sunlight striking the array 11.

The incoming solar radiation pressure near Earth is approximately 4.5e-6 $N/M^2$. Multiplying by the area of the solar array 11, the force due to solar radiation pressure is calculated. For a Globalstar spacecraft 10, this force is approximately 60 $\mu N$. If it is assumed that the coefficient of absorption for the solar array 11 is 0.74 (coefficient of reflection 0.26), the beta angle is 55 degrees, which provides an average component of the normalized reflection force vector over the orbit of 0.4 (from FIG. 8), and the 165 degree yaw bias, the resulting force is 6 $\mu N$.

Some of the reflected light is diffused. For the diffused portion of reflected light, the resulting force is perpendicular to the reflecting surface. It is difficult to estimate the diffused versus specularly reflected light ratio, but this effect reduces the force by some amount. A diffusion estimate of 20 to 30 percent leads to a resulting average intrack force very close to the 4.6 $\mu N$ estimated from orbital measurements. This force corresponds to the measured peak rate of change in semi-major axis.

There are also perturbations in the radial and crosstrack directions due to the solar radiation pressure. However, these are less observable due to the higher energies required to make out-of-plane orbit changes and other perturbations affecting the system.

Figure 11:
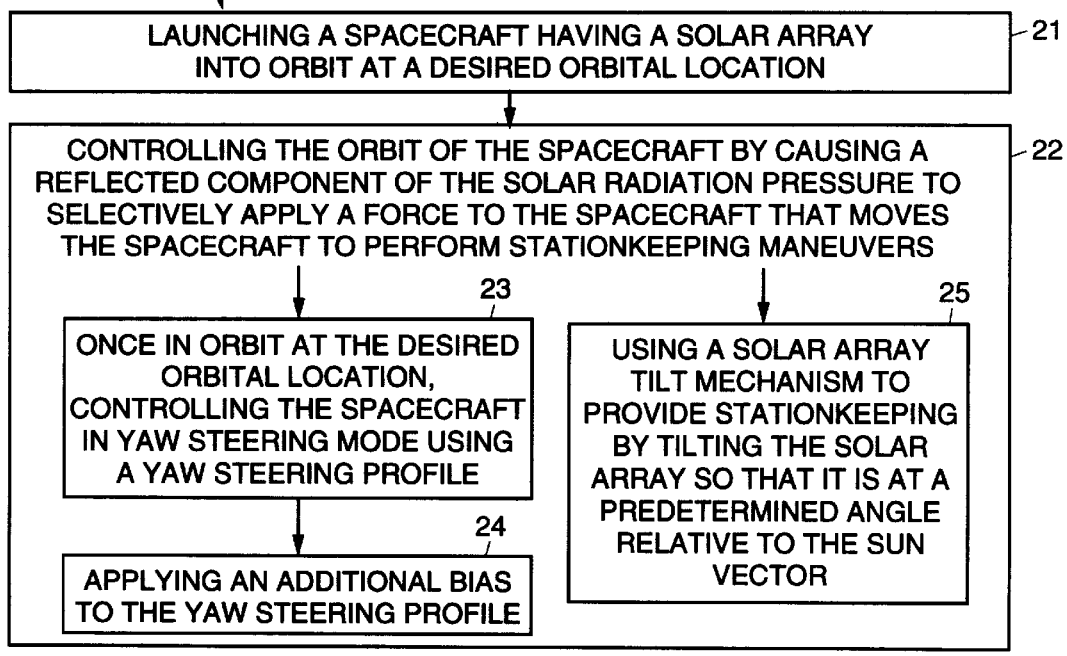
FIG. 11 is a flow diagram illustrating exemplary methods in accordance with the principles of the present invention that provides stationkeeping maneuvering of an orbiting spacecraft using reflected solar radiation pressure.

Given the above understanding of the cause and effects of the phenomena in question, this knowledge may be used in accordance with the principles of the present invention to augment currently-used stationkeeping strategies employed for existing spacecraft 10 and/or provide for new stationkeeping strategies that take advantage of controlled use of the reflected solar radiation pressure force, without the use of thrusters. FIG. 11 is a flow diagram illustrating exemplary methods 20 in accordance with the principles of the present invention that provides stationkeeping maneuvering of an orbiting spacecraft 10.

In general, the present method 20 comprises the following steps. A spacecraft 10 having a solar array 11 is launched 21 into orbit at a desired orbital location. Then a reflected component of the solar radiation pressure is caused 22 to selectively apply a force to the spacecraft 10 that moves the spacecraft 10 to perform stationkeeping maneuvers.

A first specific embodiment of the general method 20 uses reflected solar radiation pressure via yaw biasing 23, while a second specific embodiment tilts 24 the solar array to achieve the same effect.

The first specific embodiment of the method 20 comprises the following steps. A spacecraft 10 having a solar array 11 is launched 21 into orbit at a desired orbital location. Once in orbit at the desired orbital location, the spacecraft 10 is yaw steered 23 to follow a yaw steering profile so that the axis of the solar array is substantially normal to a plane containing the sun vector and nadir vector.

The orbit of the spacecraft 10 is then controlled 24 to provide stationkeeping by applying an additional bias to the yaw steering profile. This action rotates the spacecraft 10 around an axis that points toward the central body 12, or Earth 12 (the Z axis of the spacecraft 10), by a predetermined angular amount to cause a reflected component of the solar radiation pressure to selectively apply a force to the spacecraft 10 that moves the spacecraft 10 to perform stationkeeping maneuvers.

The reflected component of the solar radiation pressure selectively applies a force to the spacecraft 10 that is parallel or antiparallel to the orbital velocity vector of the spacecraft 10 (depending upon the position of the spacecraft 10 in its orbit) in an amount that overcomes atmospheric drag and moves the spacecraft 10 to perform stationkeeping maneuvers. Commands from an Earth control station may be sent to the spacecraft 10 to change the yaw bias to the yaw steering profile, or the yaw bias may be programmed into a command and control system on the spacecraft 10 to automatically apply the additional yaw bias.

In the second specific embodiment of the method 20, a spacecraft 10 having a solar array 11 is launched 21 into orbit at a desired orbital location. Once in orbit at the desired orbital location, the orbit of the spacecraft 10 is controlled to provide stationkeeping by tilting 25 (or rotating 24) the solar array 11, using an array tilt mechanism 14 (generally identified using an arrow in FIGS. 4 and 5), for example, so that the solar array 11 is not perpendicular to the sun vector, and is at a predetermined angle relative thereto. The solar array 11 is tilted 25 (or rotated 25) to a desired angle that causes a reflected component of the solar radiation pressure to selectively apply a force to the spacecraft that moves the spacecraft to perform stationkeeping maneuvers.

Commands from an Earth control station may be sent to the spacecraft 10 to tilt 25 (or rotate 25) the solar array 11, or the solar array tilting command may be programmed into a command and control system on the spacecraft 10 to automatically tilt the solar array 11.

The ability to stationkeep the spacecraft 10 without using thrusters has a number of advantages. The spacecraft 10 are much less sensitive to thruster failure since they are not required for stationkeeping. Stationkeeping is believed to be operationally simpler and less risky, since the only commanding requirement is for a yaw bias or tilt angle as needed. The lifetime of fuel critical spacecraft 10 may be considerably extended since the thrusters are not used for stationkeeping. Propellant reserves for non-fuel critical spacecraft 10 may be used for end-of-life de-orbit, lowering the spacecraft 10 to an altitude where it would decay in a reasonable time period.

Thus, methods that provides stationkeeping maneuvering of yaw steered spacecraft using reflected solar radiation pressure have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method that provides stationkeeping maneuvering of a yaw steered spacecraft that orbits around a central body and experiences solar radiation pressure produced by the sun, comprising the steps of:

launching a yaw steered spacecraft having a solar array into orbit at a desired orbital location; and once the spacecraft is in orbit at the desired orbital location, causing a reflected component of the solar radiation pressure to selectively apply a force to the spacecraft that moves the spacecraft to perform stationkeeping maneuvers.

2. The method recited in claim 1 wherein the step of causing a reflected component of the solar radiation pressure to selectively apply a force to the spacecraft comprises the steps of:

yaw steering the spacecraft to follow a yaw steering profile so that the axis of the solar array is substantially normal to a plane containing the sun vector and nadir vector; and applying an additional bias to the yaw steering profile to control the orbit of the spacecraft and provide stationkeeping.

3. The method recited in claim 2 wherein the additional bias is applied as a command from a control station that is remotely located from the spacecraft.

4. The method recited in claim 2 wherein the additional bias is applied as a command in a command and control system on the spacecraft that automatically applies the additional yaw bias.

5. The method recited in claim 1 wherein the step of causing a reflected component of the solar radiation pressure to selectively apply a force to the spacecraft comprises the step of:

tilting the solar array so that it is at a predetermined angle relative to the sun vector to control the orbit of the spacecraft and provide stationkeeping.

6. A method that provides stationkeeping maneuvering of a yaw steered spacecraft that orbits around a central body and experiences solar radiation pressure produced by the sun, comprising the steps of:

launching a yaw steered spacecraft having a solar array into orbit at a desired orbital location;

once the spacecraft is in orbit at the desired orbital location, yaw steering the spacecraft to follow a yaw steering profile so that the axis of the solar array is substantially normal to a plane containing the sun vector and nadir vector; and applying an additional bias to the yaw steering profile to control the orbit of the spacecraft and provide stationkeeping.

7. The method recited in claim 6 wherein the additional bias is applied as a command from a control station that is remotely located from the spacecraft.

8. The method recited in claim 6 wherein the additional bias is applied as a command in a command and control system on the spacecraft that automatically applies the additional yaw bias.

9. A method that provides stationkeeping maneuvering of a yaw steered spacecraft that orbits around a central body and experiences solar radiation pressure produced by the sun, comprising the steps of:

launching a yaw steered spacecraft having a solar array into orbit at a desired orbital location; and once the spacecraft is in orbit at the desired orbital location, tilting the solar array so that it is at a predetermined angle relative to the sun vector to control the orbit of the spacecraft and provide stationkeeping.

10. The method recited in claim 9 wherein the solar array is tilted using a command transmitted from a control station that is remotely located from the spacecraft.

11. The method recited in claim 9 wherein the solar array is tilted using a command in a command and control system on the spacecraft.

* * * * *